(12) United States Patent
Ghielmi et al.

(10) Patent No.: US 8,404,400 B2
(45) Date of Patent: Mar. 26, 2013

(54) CATALYST-POLYMER LIQUID DISPERSION FOR FUEL CELL APPLICATIONS

(75) Inventors: Alessandro Ghielmi, Milan (IT); Luca Merlo, Montorfano (IT); Gilberto Nucida, San Guiliano Milanese (IT); Vincenzo Arcella, Milan (IT)

(73) Assignee: Solvay Solexis S.p.A., Bollate (IT)

( * ) Notice: Subject to any disclaimer, the term of this patent is extended or adjusted under 35 U.S.C. 154(b) by 939 days.

(21) Appl. No.: 12/305,032

(22) PCT Filed: Jun. 25, 2007

(86) PCT No.: PCT/EP2007/056291
§ 371 (c)(1),
(2), (4) Date: Dec. 16, 2008

(87) PCT Pub. No.: WO2008/000709
PCT Pub. Date: Jan. 3, 2008

(65) Prior Publication Data
US 2009/0202883 A1    Aug. 13, 2009

(30) Foreign Application Priority Data
Jun. 28, 2006 (EP) .................................. 06116234

(51) Int. Cl.
*H01M 4/02* (2006.01)
*H01M 4/36* (2006.01)

(52) U.S. Cl. ....................... 429/523; 429/530

(58) Field of Classification Search .................. None
See application file for complete search history.

(56) References Cited

U.S. PATENT DOCUMENTS

| | | | |
|---|---|---|---|
| 4,272,353 | A | 6/1981 | Lawrance et al. |
| 5,330,860 | A | 7/1994 | Grot et al. |
| 5,415,888 | A | 5/1995 | Banerjee et al. |
| 5,547,911 | A | 8/1996 | Grot |
| 5,876,571 | A | 3/1999 | Buck |
| 6,180,276 | B1 | 1/2001 | Kim et al. |
| 6,221,523 | B1 | 4/2001 | Chun et al. |
| 6,555,639 | B2 | 4/2003 | Apostolo et al. |
| 6,576,100 | B2 | 6/2003 | Arcella et al. |
| 6,767,977 | B2 | 7/2004 | Arcella et al. |
| 2004/0107869 | A1 * | 6/2004 | Velamakanni et al. .... 106/31.92 |
| 2004/0241518 | A1 * | 12/2004 | Yang ................................ 429/33 |
| 2005/0000799 | A1 * | 1/2005 | Murphy et al. ................. 204/252 |
| 2006/0014887 | A1 * | 1/2006 | Hamrock et al. .............. 524/544 |

FOREIGN PATENT DOCUMENTS

| | | |
|---|---|---|
| EP | 0064389 A1 | 11/1982 |
| EP | 1535935 A1 * | 6/2005 |
| EP | 1702669 A1 | 9/2006 |
| JP | 2005048121 A | 2/2005 |

* cited by examiner

*Primary Examiner* — Emily Le
*Assistant Examiner* — Michael Forrest
(74) *Attorney, Agent, or Firm* — Arent Fox LLP

(57) ABSTRACT

Catalyst-polymer liquid dispersion (LD) comprising (i) catalyst particles, (ii) polymer particles consisting of at least one (per)fluoro sulfonyl fluoride polymer in the —$SO_2F$ form, and (iii) an aqueous suspending medium.
Catalyst coated membrane precursor (CCMP), catalyst coated membrane (CCM) and catalytic ionomeric ink (CII) derived therefrom and methods for their manufacture. Catalyst coated membrane (CCM-CII) derived from said (CII).

20 Claims, No Drawings

CATALYST-POLYMER LIQUID DISPERSION FOR FUEL CELL APPLICATIONS

CROSS REFERENCE TO RELATED APPLICATIONS

This application is a U.S. national stage application under 35 U.S.C. §371 of International Application No. PCT/EP2007/056291 filed Jun. 25, 2007, which claims priority to European Application No. 06116234.3, filed Jun. 28, 2006, these applications being herein incorporated by reference in their entirety for all purposes.

The present invention is directed to a catalyst-polymer liquid dispersion (LD) useful for the manufacture of certain parts of a fuel cell. The present invention is also directed to a catalyst coated membrane precursor (CCMP), a catalyst coated membrane (CCM) and a catalytic ionomeric ink (CII) obtainable from the aforementioned liquid dispersion (LD), to methods for their manufacture and to a catalyst coated membrane (CCM-CII) derived from said catalytic ionomeric ink (CII).

The basic element of a fuel cell is the so-called "membrane electrode assembly" (MEA). The MEA comprises a membrane which consists of a proton conducting polymer and whose opposing faces are in contact with electrically conductive and catalytically active layers (also called electrode layers). Said electrode layers catalyze the oxidation of the fuel and the reduction of the oxidizing agent, and contribute to assure the necessary electrical conductivity within the fuel cell.

A particular type of MEA is the two or usually three layers MEA also called "catalyst coated membrane" (CCM), which consists of a proton conducting membrane having one or usually two electrode layers adhering thereupon.

Different methods have been disclosed for the preparation of a CCM.

These methods are generally based on the utilization of catalytic inks which are used to build up electrode layers onto the surface of a proton conducting membrane (for instance by screen printing or solution coating).

Prior art catalytic inks are usually liquid or pasty suspensions or slurries generally comprising, notably: catalyst particles; functionally substituted polymers, in particular, polymers bearing ionic functional groups also called ionomers (e.g. perfluoro ionomer(s) like NAFION® ionomer bearing sulfonic —$SO_3H$ acid groups); unfunctionalized polymers (e.g. perfluoro polymer(s) like TEFLON® polytetrafluoroethylene); water in combination with organic compounds, together acting as suspending and/or dissolving media.

Typically, the above mentioned functionally substituted or unfunctionalized polymers fulfill the function of "binder" since they are incorporated in the electrode layers of a CCM in order to improve the mechanical properties of the layers (notably, the cohesion between the catalyst particles within the layer) as well as their adhesion onto the surface of the proton conducting membrane.

The functionally substituted polymers, in particular those bearing ionic functional groups (also called "ionomeric binders"), once incorporated in the electrode layer, can also improve the ionic conductivity at the interface between the electrode layer and the surface of the proton conducting membrane while improving the hydrophilicity and the global electrochemical performance of the CCM when it is used in a fuel cell.

Prior art catalytic inks may be printed, coated or bonded onto the surface of the membrane by methods known in the art.

However, several problems are still associated with the formulation of such inks, their manufacturing as well as their utilization, and significant improvements are still needed.

In particular, it would be desirable to provide new catalytic inks having reduced viscosity in order to facilitate their uniform spreading onto the surface of a membrane while preserving stable and homogeneous dispersion of their components, notably of the binder, thus avoiding e.g. settling and/or demixing phenomena.

It would also be desirable that suspending and/or dissolving media be as far as possible free from organic compounds which are generally either expensive, health hazardous and/or easily flammable.

For the purpose of formulating aqueous or predominantly aqueous catalytic inks, ionomeric polymer binders would seem, at first sight, more interesting than non-ionomeric and/or unfunctionalized polymer binders. However, even in this case, the experience shows that it is generally not possible to avoid the presence of sometimes considerable amount of organic solvent(s) (e.g. branched aliphatic alcohols) in order to achieve good dissolution and/or dispersion of the ionomer. Furthermore, the preparation of catalytic ink containing ionomeric binders may involve time-consuming and cumbersome procedures, notably because the ionomeric binder have to be preliminary manufactured starting from their functionally substituted non-ionomeric precursor (e.g. by multi-steps hydrolysis procedures involving salification and acidification reactions).

Alternatively, the precursor of the ionomeric binder may be directly formulated into the catalytic ink but, in this case, non aqueous or predominantly non aqueous organic suspending and/or dissolving media are generally needed to achieve satisfactory degree of dispersion and/or dissolution.

Of course, desirable inks should be chemically stable in as much as possible.

In particular, the suspending and/or dissolving media of the ink should not react with the functional groups of the functionally substituted binder thus helping to preserve the ionic conductivity of the final MEA.

Last but not least, the preparation of such catalytic inks should be as simple and cost effective as possible.

U.S. Pat. No. 5,330,860 tries to solve some of the aforementioned problems. In particular it describes catalytic inks which comprise, notably, functionally substituted binders such as perfluoro sulfonyl fluoride polymers or perfluoro sulfonic acid polymer. Such inks are alleged to have, notably, limited viscosity while efficiently suspending or dissolving the binder without interacting with its functional groups.

However, according to U.S. Pat. No. 5,330,860, the binders are provided in solution of hydrocarbon solvent (in case of the sulfonyl fluoride polymer) or in solution of alcohol and water (in case of the sulfonic acid polymer).

Furthermore the inks disclosed in U.S. Pat. No. 5,330,860 always comprise significant amount (at least 50 wt %) of a suspending medium comprising a hydrocarbon having an ether, epoxy or ketone linkage and an alcohol group.

Of course, due to the extensive incorporation of organic media, such inks are expected to be more expensive and to raise much more safety problems than possibly aqueous or predominantly aqueous inks.

The present invention aims at meeting most, if not all, of the above described needs and overcoming most, if not all, of the above described problems.

DESCRIPTION OF THE INVENTION

With this end in view the present invention is directed to a catalyst-polymer liquid dispersion (LD) comprising (i) catalyst particles, (ii) polymer particles consisting of at least one (per)fluoro sulfonyl fluoride polymer in the —SO$_2$F form, and (iii) an aqueous suspending medium.

The catalyst-polymer liquid dispersion (LD), as it will be apparent from the following description, is particularly suitable for the cost effective and simple preparation of improved catalyst coated membranes and precursors thereof (CCM and CCMP) and of improved catalytic ionomeric inks (CII).

The term "dispersion" is herein intended to denote a suspension of solid particles finely dispersed in a liquid suspending medium.

The term "liquid" referred to "dispersion" is herein intended to denote that the dispersion according to the invention flows, at room temperature and pressure, and quickly conforms to the outline of its container.

It has to be noted that the expression "aqueous suspending medium" is intended to denote a continuous water phase which fulfills the function of suspending medium. Accordingly, the function of suspending the catalyst and the polymer particles in the liquid dispersion (LD) is substantially or, preferably, exclusively fulfilled by the water phase. In case one or more liquid component(s), other than water, susceptible to fulfill this function, be present in the liquid dispersion (LD), the amount of such liquid component(s) should be advantageously less than 2% of the total weight of the aqueous suspending medium, preferably less than 1%, more preferably less than 0.5% and still more preferably less than 0.1%.

The term "catalyst particles" is herein intended to denote particles comprising any active compound capable to catalyze, under the pressure and temperature conditions of a fuel cell, the electro reduction of the oxygen or the electro oxidation of hydrogen or another suitable fuel.

Active compounds useful in the frame of the present invention are for instance: precious metals like platinum, ruthenium, gold, palladium, rhodium, iridium; their electro conductive oxides; alloys thereof, optionally, in combination with other transition metals.

Preferably the active compound is a metal, and more preferably it is platinum.

According to the present invention, the active compound may be supported on a suitable material, herein called "carrier", which is preferably electrically conductive. The carrier is advantageously chosen from carbon powder, carbon nano-tubes and mixtures thereof. Carbon nano-tubes useful for the present invention are either multi-wall or single-wall nano tubes. Preferably, the carrier is carbon powder, for instance carbon black.

The catalyst particles comprising an active compound and a carrier advantageously comprise at least 5 wt % of the active compound based on the total weight of the active compound and the carrier. Preferably, at least 10 wt % and more preferably at least 30 wt %. Besides, these catalyst particles advantageously comprise at most 90 wt % of active compound based on the total weight of the active compound and the carrier. Preferably, at most 80 wt % and, more preferably, at most 70 wt %.

In certain preferred embodiments of the present invention, the catalyst particles comprise a metal supported on carbon black. In such preferred embodiments, the metal is more preferably platinum.

The size of the catalyst particles (on an unsupported basis) is advantageously of at least about 5 Å, preferably of at least about 10 Å, and preferably of at least about 20 Å. In addition it is advantageously no greater than about 500 Å and preferably no greater than about 200 Å.

The size of the catalyst particle is herein intended to indicate the diameter of a circle that has the same area as the largest projected area of the particle.

In the catalyst-polymer liquid dispersion (LD), the weight ratio of the catalyst particles (including their support, if any) to the polymer particles is advantageously of at least about 1:1 and preferably of at least 2:1.

In addition, the weight ratio is advantageously no more than about 20:1 and preferably no more than about 15:1.

In certain preferred embodiments, the weight ratio of the supported catalyst particles to the polymer particles is 3:1. In certain other preferred embodiments, the weight ratio of the supported catalyst particles to the polymer particles is 9:1.

The amount of catalyst particles (including their support, if any) in the catalyst-polymer liquid dispersion (LD) is advantageously of at least 1 wt % based on the total weight of the catalyst-polymer liquid dispersion (LD). Preferably, it is of at least 3 wt % and more preferably of at least 5 wt %. Besides, the amount of catalyst particles (including their support, if any) in the catalyst-polymer liquid dispersion (LD) is advantageously of at most 50 wt % based on the total weight of the catalyst-polymer liquid dispersion (LD), preferably of at most 40 wt % and more preferably of at most 30 wt %.

In certain preferred embodiments, the amount of the supported catalyst particles in the catalyst-polymer liquid dispersion (LD) is of about 7 wt % based on the total weight of the catalyst-polymer liquid dispersion (LD).

By (per)fluoro sulfonyl fluoride polymer in the —SO$_2$F form is meant any (per)fluoro polymer bearing sulfonyl fluoride —SO$_2$F groups which have not been substantially transformed into the corresponding sulfonate —SO$_3$M (M=metal) or sulfonic —SO$_3$H groups.

The (per)fluoro sulfonyl fluoride polymer according to the present invention advantageously comprises repeating monomeric units derived from: (A), at least one ethylenically unsaturated (per)fluoro monomer free from —SO$_2$F groups; (B), at least one (per)fluoro vinyl ether comprising at least one —SO$_2$F group.

The ethylenically unsaturated (per)fluoro monomer free from —SO$_2$F groups (hereinafter called "monomer (A)" or "(A)") is advantageously selected from: vinylidene fluoride; C2-C8 perfluoro olefins, such as tetrafluoroethylene or hexafluoropropylene; C2-C8 chloro- and/or bromo- and/or iodo-fluoro olefins, such as chlorotrifluoroethylene and bromotrifluoroethylene; CF$_2$=CFOR$_f$ (per)fluoro alkylvinylethers, wherein R$_f$ is a C1-C6 (per)fluoro alkyl, such as trifluoromethyl, bromodifluoromethyl, pentafluoropropyl; CF$_2$=CFOX perfluoro-oxyalkylvinyl ethers, wherein X is a C1-C12 perfluoro-oxyalkyl having one or more ether groups, such as perfluoro-2-propoxy-propyl; bis-olefin with formula R$_1$R$_2$C=CH—(CF$_2$)$_{m0}$—CH=CR$_5$R$_6$ wherein m0=2-10, preferably 4-8, and R$_1$, R$_2$, R$_5$, R$_6$, equal to or different from each other, are H or C1-C5 alkyl groups.

The term "olefin" is generally intended to denote an unsaturated aliphatic hydrocarbon. More specifically, the term "olefin" is herein referred to those unsaturated aliphatic hydrocarbons whose all of the hydrogen atoms, or part of them, have been replaced by halogen atoms (i.e. F, Cl, Br, I). For instance the expression "pefluoro olefin" is herein intended to denote those unsaturated aliphatic hydrocarbons wherein all of the hydrogen atoms have been replaced by fluorine atoms.

Preferably, monomer (A) is at least one C2-C8 perfluoro olefin. More preferably, monomer (A) is tetrafluoroethylene.

The (per)fluoro vinyl ether comprising at least one —SO$_2$F group (hereinafter called "monomer (B)" or "(B)") is advantageously selected from: F$_2$C=CF—O—CF$_2$—CF$_2$—

$SO_2F$; $F_2C=CF-O-[CF_2-CXF-O]_n-CF_2-CF_2-SO_2F$ wherein $X=Cl$, F or $CF_3$ and n=1-10; $F_2C=CF-O-CF_2-CF_2-CF_2-SO_2F$; $F_2C=CF-O-CF_2-CF_2-CF_2-CF_2-SO_2F$; $F_2C=CF-Ar-SO_2F$ wherein Ar is an aryl ring.

Preferably, monomer (B) is at least one sulfonyl fluoride perfluoro vinyl ether. More preferably, monomer (B) is a sulfonyl fluoride perfluoro vinyl ether with formula $F_2C=CF-O-CF_2-CF_2-SO_2F$.

In certain embodiments of the present invention, monomer (A) is at least one C2-C8 perfluoro olefin and monomer (B) is at least one sulfonyl fluoride perfluoro vinyl ether.

In certain preferred embodiments, monomer (A) is at least one C2-C8 perfluoro olefin and monomer (B) is a sulfonyl fluoride perfluoro vinyl ether with formula $F_2C=CF-O-CF_2-CF_2-SO_2F$.

In certain more preferred embodiments, monomer (A) is tetrafluoroethylene and monomer (B) is a sulfonyl fluoride perfluoro vinyl ether with formula $F_2C=CF-O-CF_2-CF_2-SO_2F$.

Preferably, the (per)fluoro sulfonyl fluoride polymer in the $-SO_2F$ form consists of repeating monomeric units derived from: (A), at least one ethylenically unsaturated (per)fluoro monomer free from $-SO_2F$ groups; (B), at least one (per) fluoro vinyl ether comprising at least one $-SO_2F$ group.

In certain still more preferred embodiments, the polymer particles consist of a perfluoro sulfonyl fluoride polymer consisting of repeating monomeric units derived from: (A), tetrafluoroethylene and (B), a sulfonyl fluoride perfluoro vinyl ether with formula $F_2C=CF-O-CF_2-CF_2-SO_2F$.

The (per)fluoro sulfonyl fluoride polymer in the $-SO_2F$ form according to the present invention may be characterized, notably, by the equivalent weight (EW) of the ionomer derived therefrom, i.e. the ionomer obtained by transforming the sulfonyl fluoride $-SO_2F$ groups into the corresponding sulfonate $-SO_3M$ (M=metal) or sulfonic $-SO_3H$ ionic groups. The EW of said ionomer is defined as the amount (expressed in grams) of ionomer comprising one equivalent of ionic groups. The EW of the ionomer derived from the (per)fluoro sulfonyl fluoride polymer according to the present invention is advantageously of at least 400 grams/equivalent, preferably of at least 600 grams/equivalent. Besides, the EW is advantageously of at most 1700 grams/equivalent and preferably of at most 1500 grams/equivalent.

In certain preferred embodiments, the (per)fluoro sulfonyl fluoride polymer in the $-SO_2F$ form according to the present invention is characterized by an EW of the corresponding ionomer equal to 1100 grams/equivalent.

In certain other preferred embodiments, the (per)fluoro sulfonyl fluoride polymer in the $-SO_2F$ form according to the present invention is characterized by an EW of the corresponding ionomer equal to 850 grams/equivalent.

According to the present invention, the polymer particles consisting of at least one (per)fluoro sulfonyl fluoride polymer in the $-SO_2F$ form are preferably those of an aqueous latex. The term "aqueous latex" is herein intended to denote a colloid in which solid polymer particles having a size of between 1 nm and 1000 nm are dispersed in an aqueous suspending medium. These very fine solid polymer particles are permanently supported in the fluid by buoyancy and are evenly scattered above over its entire volume. The size of the polymer particle is herein intended to indicate the diameter of a circle that has the same area as the largest projected area of the particle.

Advantageously, the polymer particles of the aqueous latex have a size of at least 10 nm and preferably of at least 20 nm. Besides, the polymer particles have advantageously a size of at most about 300 nm, preferably of at most about 200 nm and more preferably of at most about 150 nm. In certain preferred embodiments of the invention, the size of the polymer particles does not exceed about 100 nm.

Advantageously, the aqueous latex is obtainable throughout an emulsion or micro-emulsion polymerization process comprising the copolymerization of monomers (A) and (B).

Preferably the aqueous latex is obtainable throughout an emulsion or micro-emulsion polymerization process comprising the copolymerization of at least one C2-C8 perfluoro olefin and at least one sulfonyl fluoride perfluoro vinyl ether.

More preferably, the aqueous latex is obtainable throughout a micro-emulsion polymerization process comprising the copolymerization of at least one C2-C8 perfluoro olefin and at least one sulfonyl fluoride perfluoro vinyl ether.

Still more preferably the aqueous latex is obtainable throughout a micro-emulsion polymerization process comprising the copolymerization of at least one C2-C8 perfluoro olefin and a sulfonyl fluoride perfluoro vinyl ether with formula $F_2C=CF-O-CF_2-CF_2-SO_2F$.

Most preferably, the aqueous latex is obtainable throughout a micro-emulsion polymerization of tetrafluoroethylene with a sulfonyl fluoride perfluoro vinyl ether with formula $F_2C=CF-O-CF_2-CF_2-SO_2F$.

The emulsion polymerization process can be carried out by techniques known in the art.

The micro-emulsion polymerization process referred to in the present invention is described notably in U.S. Pat. No. 6,555,639 whose content is herein incorporated by reference.

The amount of polymer particles present in the above described aqueous latex is advantageously of at least 5 wt % based on the total weight of the aqueous latex, and, preferably, of at least 10 wt %. Besides, the amount of polymer particles present in the above described aqueous latex is advantageously of at most 80 wt %, and, preferably, of at most 60 wt %.

When the aqueous latex is obtained throughout an emulsion or micro-emulsion polymerization process, the liquid suspending medium of the latex typically comprises small amounts of (per)fluoropolyether(s) and/or fluorinated surfactant(s) which are either emulsified (e.g. like in a oil-water colloid) and/or dissolved in it.

Such compounds are generally used as additives in the previously mentioned emulsion or micro-emulsion polymerization processes.

The (per)fluoropolyether(s) are advantageously selected from the perfluoro polyethers with formula $CF_3O(CF_2=CF(CF_3)O)_n(CF_2O)_mCF_3$ wherein n/m=20. In certain preferred embodiments, these perfluoropolyether(s) have average molecular weight in the range 400-600.

Fluorinated surfactant(s) may be for instance anionic fluorinated surfactants, for example salts of fluorinated carboxylic acids or of sulphonic acids, having a perfluoro-polyether or perfluorocarbon structure or partially fluorinated, cationic surfactant, for example quaternary ammonium fluorinated salts, or still fluorinated non ionic surfactants agents. The above surfactants can be also used in admixtures.

The fluorinated surfactant(s) are advantageously selected from those with formula $CF_2ClO(CF_2=CF(CF_3)O)_n(CF_2O)_mCF_2COOR'$ wherein R'=H, Na, K, $NH_4$, n/m=10. In certain preferred embodiments, these fluorinated surfactant(s) have average molecular weight in the range 500-700.

Besides, traces of other polymerization additives and/or polymerization residues may be emulsified and/or dissolved in the liquid suspending medium of the latex.

Examples of such other polymerization additives and residues are for instance: co-surfactants (e.g. alcohols), chain transfer agents, initiators, unreacted comonomers, low molecular weight perfluorocarbons, soluble oligomers, etc.

In certain preferred embodiments, the catalyst-polymer liquid dispersion (LD) further comprises at least one viscosity modifier. Viscosity modifiers useful for the present invention are for example acrylic resins like those available under the trade name Carbopol® from Noveon, Inc.

In this embodiments, the concentration of the viscosity modifier is advantageously of at least 500 ppm, preferably of at least 2000 ppm and more preferably of at least 4000 ppm. Besides, the concentration of the viscosity modifier is advantageously less than 10000 ppm and, preferably, of at most 7000 ppm.

In some cases, especially in the presence of viscosity modifiers, it may be useful to control the pH of the catalyst-polymer liquid dispersion (LD), for instance by adding relatively little amounts of aqueous solution containing a strong base or a strong acid. Preferably the liquid dispersion (LD) is neutralized by adding a strong base (e.g. aqueous KOH).

The weight amount of the polymer particles in the catalyst-polymer liquid dispersion (LD) is advantageously of at least 0.001 wt % based on the total weight of the catalyst-polymer liquid dispersion (LD). Preferably, it is of at least 0.005 wt %. Besides, the weight amount of the polymer particles in the catalyst-polymer liquid dispersion (LD) is advantageously of at most 10 wt % based on the total weight of the catalyst-polymer liquid dispersion (LD) and, preferably, of at most 5 wt %.

The polymer particles of the liquid dispersion (LD) once incorporated in the electrode layers behave notably as a binder, improving the adhesion of the catalyst particles between themselves and of the electrode layers to the support membrane. Once the sulfonyl fluoride —$SO_2F$ groups within the binder are transformed into the corresponding sulfonate —$SO_3M$ (M=metal) or sulfonic —$SO_3H$ groups, the binder can also improve the ionic conductivity and/or the hydrophilicity of the electrode layers.

When the polymer particles of the catalyst-polymer liquid dispersion (LD) are those of an aqueous latex, notably of an aqueous latex obtained throughout the emulsion or micro-emulsion polymerization processes previously described, the aqueous suspending medium of the catalyst-polymer liquid dispersion (LD) may comprise the liquid suspending medium of the latex.

With the expression "liquid suspending medium of the latex" is herein intended to denote the liquid phase of the latex including all, or part, of the polymerization additives and/or residues previously described which are either dissolved and/or emulsified in it.

Alternatively, when the polymer particles of the catalyst-polymer liquid dispersion (LD) are those of an aqueous latex, in particular of an aqueous latex obtained throughout the emulsion or micro-emulsion polymerization processes previously described, the catalyst-polymer liquid dispersion (LD) may be substantially free from the liquid suspending medium of the latex. "Substantially free" means that if traces of the liquid suspending medium of the latex are still present in the liquid dispersion (LD), such traces represent advantageously less than 1% of the total weight of the liquid dispersion (LD), preferably less than 0.5%, more preferably less than 0.1% and still more preferably less than 0.01%.

For certain uses, the catalyst-polymer liquid dispersion (LD) comprising the polymer particles of an aqueous latex is preferably free from the liquid suspending medium of the latex.

The catalyst-polymer liquid dispersion (LD) comprising the polymer particles of an aqueous latex, yet being free from the liquid suspending medium of said latex, is advantageously obtained by a method (M-LD) which comprises: step (a) mixing an aqueous latex of polymer particles with an aqueous suspension of catalyst particles so as to obtain a catalyst-polymer liquid dispersion (LD) comprising the liquid suspending medium of the latex; step (b) removing the liquid (e.g. by filtration) so as to isolate the solid constituent of the catalyst-polymer liquid dispersion (LD); optionally, step (c) washing the solid with pure water; optionally, step (d) drying the solid and, optionally, grinding it, so as to obtain a smooth powder; step (e) dispersing the solid into pure water.

For the avoidance of doubt, the aqueous latex, the polymer particles and the catalyst particles mentioned in relation to method (M-LD) comply, at any level of preference, with all the features of the aqueous latex, the polymer particles and the catalyst particles previously described for the liquid dispersion (LD). The expression "pure water" indicates, for instance, distilled or deionized water.

Preferably, the catalyst-polymer liquid dispersion (LD) according to the present invention is substantially free from any organic solvent.

"Substantially free" means that if any organic solvent is present in the liquid dispersion (LD), the weight of such organic solvent represents advantageously less than 1% of the total weight of the liquid dispersion (LD), preferably less than 0.5%, more preferably less than 0.1% and still more preferably less than 0.01%.

More preferably, the catalyst-polymer liquid dispersion (LD) according to the present invention is free from any organic solvent.

According to general common knowledge, the term "organic solvent" is intended to denote, for example: saturated and unsaturated hydrocarbons, halo-hydrocarbons, alcohols and polyols, esters, ketones, epoxy compounds, aromatic compounds, amines, ethers, carboxylic compounds, amides, sulfones like for instance dimethyl sulfoxyde, heteroaromatic compounds like for instance N-methylpyrrolidone, thio-compounds, mixtures thereof and the like.

The weight amount of the (i) catalyst particles, the (ii) polymer particles and the (iii) aqueous suspending medium in the catalyst-polymer liquid dispersion (LD) according to the present invention is advantageously of at least 96 wt %, preferably of at least 97 wt %, more preferably of at least 98 wt % and still more preferably of at least 99 wt % based on the total weight of the liquid dispersion (LD).

Preferably, the catalyst-polymer liquid dispersion (LD) according to the present invention consists essentially of (i) catalyst particles, (ii) polymer particles consisting of at least one (per)fluoro sulfonyl fluoride polymer in the —$SO_2F$ form, (iii) an aqueous suspending medium and (iv), optionally, at least one viscosity modifier.

More preferably, the catalyst-polymer liquid dispersion (LD) according to the present invention consists of (i) catalyst particles, (ii) polymer particles consisting of at least one (per)fluoro sulfonyl fluoride polymer in the —$SO_2F$ form, (iii) an aqueous suspending medium and (iv), optionally, at least one viscosity modifier.

In such preferred embodiments the weight amount of the viscosity modifier, when present, is advantageously of less the 2 wt % based on the total weight of the liquid dispersion (LD), preferably of less than 1 wt %.

In certain preferred embodiments of the present invention the catalyst-polymer liquid dispersion (LD) consists essentially of (i) catalyst particles, (ii) polymer particles consisting of at least one (per)fluoro sulfonyl fluoride polymer in the —$SO_2F$ form, (iii) an aqueous suspending medium, and (iv) at least one viscosity modifier. In these preferred embodiments, the polymer particles are those, previously defined, of an aqueous latex obtained throughout an emulsion or micro-emulsion polymerization process comprising the copolymerization of the monomers (A) and (B). Besides, in these preferred embodiments, the catalyst-polymer liquid dispersion (LD) is substantially free from the liquid suspending medium of the latex.

A second aspect of the present invention is a method (M-CCMP) to obtain a catalyst coated membrane precursor (CCMP), said method comprising: step (j), applying onto the surface(s) of a membrane the catalyst-polymer liquid dispersion (LD) previously described, said membrane being a film consisting of at least one (per)fluoro sulfonyl fluoride polymer in the —$SO_2F$ form; step (jj), removing the liquid so as to form a multilayer structure comprising coating solid layer(s) adhering onto the surface(s) of the membrane, said coating solid layer(s) comprising catalyst particles and polymer particles, said polymer particles consisting of at least one (per) fluoro sulfonyl fluoride polymer in the —$SO_2F$ form; optionally, step (jjj), hot pressing the multilayer structure.

For sake of clarity, the catalyst-polymer liquid dispersion (LD) mentioned in relation to method (M-CCMP) complies with all the features of the catalyst-polymer liquid dispersion (LD) previously described, at any level of preference. The same for the catalyst particles and the polymer particles referred to in step (jj).

In particular, when the polymer particles of the catalyst-polymer liquid dispersion (LD) used in the frame of method (M-CCMP) are those of an aqueous latex obtained throughout an emulsion or micro-emulsion polymerization processes as previously described, said catalyst-polymer liquid dispersion (LD) is preferably substantially free from the liquid suspending medium of the latex.

Moreover, the catalyst-polymer liquid dispersion (LD) mentioned in relation to method (M-CCMP) is preferably substantially free from any organic solvent.

More preferably, said catalyst-polymer liquid dispersion (LD) consists of (i) catalyst particles, (ii) polymer particles consisting of at least one (per)fluoro sulfonyl fluoride polymer in the —$SO_2F$ form, (iii) an aqueous suspending medium and (iv), optionally, at least one viscosity modifier.

The (per)fluoro sulfonyl fluoride polymer in the —$SO_2F$ form referred to in step (j) advantageously comprises repeating monomeric units derived from monomers (A') and (B') which comply, at any level of preference, with all the features of the monomers (A) and (B) which are advantageously used for the preparation of the polymer particles of the catalyst-polymer liquid dispersion (LD).

Preferably, monomer (A') is at least one C2-C8 perfluoro olefin. More preferably monomer (A') is tetrafluoroethylene.

Preferably, monomer (B') is at least one sulfonyl fluoride perfluoro vinyl ether. More preferably, monomer (B') is a sulfonyl fluoride perfluoro vinyl ether with formula $F_2C=CF-O-CF_2-CF_2-SO_2F$.

In certain embodiments of method (M-CCMP), the (per) fluoro sulfonyl fluoride polymer in the —$SO_2F$ form comprises repeating monomeric units derived from: (A') at least one C2-C8 perfluoro olefin; (B') at least one sulfonyl fluoride perfluoro vinyl ether.

In certain preferred embodiments of this method, the (per) fluoro sulfonyl fluoride polymer in the —$SO_2F$ form comprises repeating monomeric units derived from: (A') tetrafluoroethylene; (B') a sulfonyl fluoride perfluoro vinyl ether with formula $F_2C=CF-O-CF_2-CF_2-SO_2F$.

Besides, in all of the above mentioned embodiments of method (M-CCMP), the (per)fluoro sulfonyl fluoride polymer may optionally further comprise repeating monomeric units derived from at least one bis-olefin with formula $R_1R_2C=CH-(CF_2)_{m0}-CH=CR_5R_6$ wherein m0=2-10, preferably 4-8, and $R_1$, $R_2$, $R_5$, $R_6$, equal to or different from each other, are H or C1-C5 alkyl groups.

In certain more preferred embodiments of method (M-CCMP), the film consists of at least one perfluoro sulfonyl fluoride polymer in the —$SO_2F$ form consisting of repeating monomeric units derived from (A') tetrafluoroethylene and (B') a sulfonyl fluoride perfluoro vinyl ether with formula $F_2C=CF-O-CF_2-CF_2-SO_2F$.

In these more preferred embodiments, the molar ratio [(A')/(B')] is advantageously of at least 0.1, preferably of at least 1 and more preferably of at least 3. Besides, the molar ratio [(A')/(B')] is advantageously of at most 15 and preferably of at most 10.

The thickness of the membrane provided in step (j) is not particularly limited. Advantageously, the thickness is of at least 10 μm, preferably of at least 15 μm and more preferably of at least 20 μm. Besides, the thickness is advantageously of at most 300 μm, preferably of at most 200 μm, more preferably of at most 100 μm and still more preferably of at most 70 μm.

Membranes consisting of at least one (per)fluoro sulfonyl fluoride polymer in the —$SO_2F$ form suitable for the implementation of method (M-CCMP) are, for instance, those available under the trade name Hyflon® Ion precursor from Solvay Solexis, in particular the grades with formula $(C_2F_4)_n$ $(C_4F_8O_3S)_m$ (n/m≈6).

According to method (M-CCMP), only one or both sides of the membrane may be coated. Preferably, both sides are coated.

The application of the catalyst-polymer liquid dispersion (LD) onto the surface of the membrane [according to step (j)] and the removal of the liquid so as to form the coating solid layer(s) [according to step (jj)] may be carried out by any technique known in the art.

Advantageously, the application of the catalyst-polymer liquid dispersion (LD) is carried out by solution casting, dip-coating, knife-coating, spray-coating, painting (e.g. brush-painting), screen-printing, jet-printing and any combination thereof.

Preferably the application of the catalyst-polymer liquid dispersion (LD) is carried out by solution casting, knife-coating and/or dip-coating.

Advantageously, the removal of the liquid is done by evaporation at atmospheric pressure or under vacuum, preferably at temperature of at most 80° C., more preferably, of at most 70° C.

Optionally, after removal of the liquid and formation of the coating solid layer(s) adhering onto the surface(s) of the membrane, according to step (jj), the multilayer structure resulting from step (jj) is further submitted to hot pressing.

Advantageously, hot pressing of the multilayer structure is performed at pressure of at most 100 kg/cm$^2$, preferably, of at most 50 kg/cm$^2$, and more preferably of at most 30 kg/cm$^2$. Besides, hot pressing is performed at temperature advantageously of at least 50° C. and, preferably, of at least 100° C. The duration of the hot pressing is advantageously of at least 1 min and, preferably, of at least 5 min.

A further aspect of the present invention is a catalyst coated membrane precursor (CCMP) obtainable by the method (M-CCMP).

Contrary to a CCM, the catalyst coated membrane precursor (CCMP) previously described does not exhibit any ionic conductivity, due to the absence of sulfonic —$SO_3H$ groups and/or sulfonate —$SO_3M$ (M=metal) groups either in the inner membrane layer and in the outer solid layer(s). Therefore, the CCMP cannot operate, as such, within a fuel cell. However the CCMP according to the present invention may be converted into a CCM by appropriate treatments aiming, notably, at transforming the sulfonyl —$SO_2F$ groups into sulfonate —$SO_3M$ (M=metal) or sulfonic —$SO_3H$ groups.

In this connection, another aspect of the present invention is a method (M-CCM) to obtain a catalyst coated membrane (CCM), said method comprising: step (j'), applying onto the surface(s) of a membrane the catalyst-polymer liquid dispersion (LD) previously described, said membrane being a film consisting of at least one (per)fluoro sulfonyl fluoride polymer in the —$SO_2F$, —$SO_3H$ and/or —$SO_3M$ (M=metal) form; step (jj'), removing the liquid so as to form a multilayer structure comprising coating solid layer(s) adhering upon the surface(s) of the membrane, said coating solid solid layer(s) comprising catalyst particles and polymer particles, said polymer particles consisting of at least one (per)fluoro sulfonyl fluoride polymer in the —$SO_2F$ form; optionally, step (jjj'), hot pressing the multilayer structure; step (jv'), transforming the sulfonyl —$SO_2F$ groups present in the multilayer structure into sulfonate —$SO_3M$ (M=metal) or sulfonic —$SO_3H$ groups.

For the avoidance of doubt, the catalyst-polymer liquid dispersion (LD) mentioned in relation with method (M-CCM) complies, at any level of preference, with all the features of the catalyst-polymer liquid dispersion (LD) previously described. The same for the catalyst particles and the polymer particles referred to in step (jj').

In particular, according to certain preferred embodiments of the method (M-CCM), the polymer particles comprised in the catalyst-polymer liquid dispersion (LD) are those of an aqueous latex.

Said aqueous latex complies, at any level of preference, with all the features of the aqueous latex previously described in relation to the liquid dispersion (LD).

Notably, when said aqueous latex is obtained throughout an emulsion or micro-emulsion polymerization process as previously described, the catalyst-polymer liquid dispersion (LD) used for these preferred embodiments is preferably substantially free from the liquid suspending medium of the aqueous latex.

Moreover, the catalyst-polymer liquid dispersion (LD) mentioned in relation with method (M-CCM) is preferably substantially free from any organic solvent.

The catalyst-polymer liquid dispersion (LD) of method (M-CCM) more preferably consists of (i) catalyst particles, (ii) polymer particles consisting of at least one (per)fluoro sulfonyl fluoride polymer in the —$SO_2F$ form, (iii) an aqueous suspending medium and (iv), optionally, at least one viscosity modifier.

The (per)fluoro sulfonyl fluoride polymer in the —$SO_2F$, $SO_3H$ and/or —$SO_3M$ (M=metal) form referred to in step (j') advantageously comprises repeating monomeric units derived from monomers (A") and (B") which comply, at any level of preference, with all the features of the monomers (A) and (B) advantageously involved in the preparation of the polymer particles of the catalyst-polymer liquid dispersion (LD).

Preferably, monomer (A") is at least one C2-C8 perfluoro olefin. More preferably monomer (A") is tetrafluoroethylene.

Preferably, monomer (B") is at least one sulfonyl fluoride perfluoro vinyl ether. More preferably, monomer (B") is a sulfonyl fluoride perfluoro vinyl ether with formula $F_2C=CF—O—CF_2—CF_2—SO_2F$.

In certain embodiments of method (M-CCM), the (per)fluoro sulfonyl fluoride polymer in the —$SO_2F$, $SO_3H$ and/or —$SO_3M$ (M=metal) form comprises repeating monomeric units derived from: (A") at least one C2-C8 perfluoro olefin; (B") at least one sulfonyl fluoride perfluoro vinyl ether.

In certain preferred embodiments of this method, the (per)fluoro sulfonyl fluoride polymer in the —$SO_2F$, $SO_3H$ and/or —$SO_3M$ (M=metal) form comprises repeating monomeric units derived from: (A") tetrafluoroethylene; (B") a sulfonyl fluoride perfluoro vinyl ether with formula $F_2C=CF—O—CF_2—CF_2—SO_2F$.

Besides, in all the above mentioned embodiments of method (M-CCM), the (per)fluoro sulfonyl fluoride polymer in the —$SO_2F$, $SO_3H$ and/or —$SO_3M$ (M=metal) form may optionally further comprise repeating monomeric units derived from at least one bis-olefin with formula $R_1R_2C=CH—(CF_2)_{m0}—CH=CR_5R_6$ wherein m0=2-10, preferably 4-8, and $R_1$, $R_2$, $R_5$, $R_6$, equal to or different from each other, are H or C1-C5 alkyl groups.

In certain more preferred embodiments of method (M-CCM), the film consists of at least one perfluoro sulfonyl fluoride polymer in the —$SO_2F$ form consisting of repeating monomeric units derived from (A") tetrafluoroethylene and (B") a sulfonyl fluoride perfluoro vinyl ether with formula $F_2C=CF—O—CF_2—CF_2—SO_2F$.

In these more preferred embodiments, the molar ratio [(A")/(B")] is advantageously of at least 0.1, preferably of at least 1 and more preferably of at least 3. Besides, the molar ratio [(A")/(B")] is advantageously of at most 15 and preferably of at most 10.

According to certain embodiments of method (M-CCM), the membrane provided in step (j') is a film consisting of at least one (per)fluoro sulfonyl fluoride polymer in the —$SO_3H$ or the —$SO_3M$ (M=metal) form.

Membranes consisting of at least one (per)fluoro sulfonyl fluoride polymer in the —$SO_3H$ form suitable for the implementation of method (M-CCM) are, for instance, those available under the trade name Hyflon® Ion acid-form from Solvay Solexis, in particular the grades with formula $(C_2F_4)_n(C_4F_7O_4SH)_m$ (n/m≈6). Suitable membranes in the —$SO_3M$ (M=metal) form may be obtained, for instance, by treating the membranes of type Hyflon® Ion acid-form with aqueous KOH at room temperature.

According to certain other more preferred embodiments of method (M-CCM), the membrane provided in step (j') is a film consisting of at least one (per)fluoro sulfonyl fluoride polymer in the —$SO_2F$ form.

Membranes consisting of at least one (per)fluoro sulfonyl fluoride polymer in the —$SO_2F$ form suitable for the implementation of method (M-CCM) are, for instance, those available under the trade name Hyflon® Ion Precursor from Solvay Solexis, in particular the grades with formula $(C_2F_4)_n(C_4F_8O_3S)_m$ (n/m≈6).

According to the method (M-CCM), only one or both sides of the membrane may be coated. Preferably, both sides are coated.

The thickness of the membrane provided in step (j') is not particularly limited. Advantageously, the thickness is of at least 10 µm, preferably of at least 15 µm and more preferably of at least 20 µm. Besides, the thickness is advantageously of at most 300 µm, preferably of at most 200 µm, more preferably of at most 100 µm and still more preferably of at most 70 µm.

The application of the catalyst-polymer liquid dispersion (LD) onto the surface of the membrane [according to step (j')], the removal of the liquid so as to form the coating solid layer(s) [according to step (jj')] and the hot pressing of the multilayer structure [according to step (jjj')] may be carried out as previously described in case of method (M-CCMP).

During step (jv'), the sulfonyl —SO$_2$F groups present in the multilayer structure (within the coating solid layer(s) and, eventually, the membrane), may be transformed into sulfonate —SO$_3$M (M=metal, e.g. Na, K) or sulfonic —SO$_3$H groups by means of salification and/or acidification processes known in the art.

Suitable operating conditions are for instance those described in U.S. Pat. No. 6,767,977 and U.S. Pat. No. 6,576,100 whose content is herein enclosed by reference.

For example the salification may be carried out by dipping the multilayer structure obtained at the end of step (jj') or (jjj'), in an aqueous solution containing 10 wt % of KOH at temperature of 60° C. to 80° C. for at least 2 hours. At the salification end, the salified coated membrane is rinsed with pure water (e.g. distilled or deionized) at room temperature to eliminate residual KOH, thus obtaining a CCM in the —SO$_3$M form (CCM$_{SO3M}$).

The acidification may be carried out, for example, by dipping the CCM$_{SO3M}$ in an aqueous solution containing 20 wt % of HCl or HNO$_3$ at room temperature for at least 2 hours, and then by washing it with pure water. The resulting CCM in the —SO$_3$H form (CCM$_{SO3H}$) may be directly installed in a fuel cell.

Preferably, during step (jv'), the sulfonyl —SO$_2$F groups present in the multilayer structure (within the coating solid layer(s) and, eventually, the membrane) are transformed into sulfonic —SO$_3$H groups.

Another aspect of the present invention is a catalyst coated membrane (CCM) obtainable by the method (M-CCM).

Still another aspect of the present invention is a method (M-CII) to obtain a catalytic ionomeric ink (CII) in the acid —SO$_3$H form, starting from the catalyst-polymer liquid dispersion (LD) described hereinabove, said method consisting, notably, to transform the sulfonyl fluoride —SO$_2$F groups of the polymer particles of the catalyst-polymer liquid dispersion (LD) into sulfonic —SO$_3$H groups.

The invention method (M-CII) comprises: step (a') removing any liquid from the catalyst-polymer liquid dispersion (LD) previously described so as to isolate its solid constituent, said solid constituent comprising catalyst and polymer particles; optionally, step (b') washing the solid with pure water (e.g. distilled or deionized), drying and grinding it so as to obtain the solid in the form of a smooth powder; step (c') treating the solid with an aqueous strong base (e.g. KOH, 10 wt %) so as to transform the sulfonyl —SO$_2$F groups of the polymer particles into sulfonate —SO$_3$M (M=metal) groups; step (d') removing the aqueous phase in order to isolate the solid and washing the solid with pure water; step (e') treating the solid with an aqueous strong acid (e.g. HNO$_3$, 20 wt %) so as to transform the sulfonate —SO$_3$M (M=metal) groups into sulfonic —SO$_3$H groups; step (f') removing the aqueous phase in order to isolate the solid and washing the solid with pure water; optionally, step (g') drying and grinding the solid to obtain a smooth powder; step (h') dispersing the solid in a hydro-alcoholic liquid phase (e.g. 20 wt % water, 40 wt % 1-propyl alcohol, 40 wt % 2-propyl alcohol) so as to obtain a slurry.

The present invention is finally directed to a catalytic ionomeric ink (CII) obtainable by the above described method (M-CII) and to a method (M-CCM-CII) for obtaining a catalyst coated membrane (CCM-CII) from the above described catalytic ionomeric ink (CII), said method comprising step (j"), applying onto the surface(s) of a membrane the catalytic ionomeric ink (CII) previously described, said membrane being a film consisting of at least one (per)fluoro sulfonyl fluoride polymer in the —SO$_3$H form; step (jj"), removing the liquid so as to form a multilayer structure comprising coating solid layer(s) adhering upon the surface(s) of the membrane, said coating solid layer(s) comprising catalyst particles and polymer particles, said polymer particles consisting of at least one (per)fluoro sulfonyl fluoride polymer in the —SO$_3$H form; optionally, step (jjj"), hot pressing the multilayer structure.

The Applicant has found that the catalyst-polymer liquid dispersion (LD) according to the present invention is particularly suitable for the preparation of CCMs since, notably, it can be easily and uniformly spreaded on the surface of a support membrane thanks to its reduced viscosity, while preserving homogeneous and stable dispersion of the suspended solid constituents, notably the catalyst and the polymer particles.

Furthermore, the liquid dispersion (LD) does not comprise any suspending medium other than water, thus avoiding the utilization of organic solvents which are frequently used in the art as suspending media and are generally either expensive, health hazardous and/or easily flammable.

Surprisingly, in spite of the absence of such frequently used organic suspending media, the Applicant has found that the CCM obtained from the liquid dispersion (LD), eventually via the catalyst coated membrane precursor (CCMP), exhibit excellent end-use properties (e.g. lower ohmic resistivity, improved voltage/current balance when installed in a fuel cell) in comparison to ordinary CCMs which are prepared from prior art catalytic inks comprising organic or predominantly organic suspending media (e.g. water/alcohol mixtures).

Moreover, the catalyst-polymer liquid dispersion (LD) usually provides in a very simple and cost effective way a finely dispersed, homogeneous and stable suspension of a functionally substituted polymer binder, directly usable for the manufacturing of a CCM. That avoids the complex and cumbersome procedures which characterize the preparation and utilization of prior art catalytic ionomeric inks containing ionomeric binders.

Provided below are examples of the catalyst-particle liquid dispersions (LD) according to the present invention, and of CCMP, CCM, CII and CCM-CII derived therefrom. These examples are illustrative of the present invention but not limitative thereof.

Example 1

Preparation of the Catalyst-Polymer Liquid Dispersion (LD)1 a) Preparation of the Aqueous Latex of a Perfluoro Sulfonyl Fluoride Polymer in the —SO$_2$F Form (EW 850 Grams/Equivalent).

In a 22 liters autoclave the following reagents were charged:

11.5 liters of demineralized water 980 grams of the sulfonyl fluoride perfluoro vinyl ether with formula:

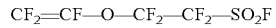

3100 grams of a water solution containing 5 wt % of the fluorinated surfactant CF$_2$ClO(CF$_2$CF(CF$_3$)O)$_n$(CF$_2$O)$_m$CF$_2$COOK (average molecular weight=521; n/m=10).

The content of the autoclave was stirred at 540 rounds per minute (rpm) and heated. Once reached a temperature of 60° C., 150 milliliters of a water solution containing 6 grams of potassium persulfate per liter were added. The pressure in the autoclave was maintained at a value of 13 bar abs. while feeding 1000 grams of tetrafluoroethylene (TFE). Once completed the addition of TFE, 175 grams of $CF_2=CF—O—CF_2—CF_2—SO_2F$ were further fed into the autoclave. During the polymerization reaction, additional amounts of TFE and $CF_2=CF—O—CF_2—CF_2—SO_2F$ were fed into the autoclave (175 grams of $CF_2=CF—O—CF_2—CF_2—SO_2F$ for every 200 grams of TFE). After a overall polymerization reaction time of 248 minutes and the addition of a total amount of TFE of 4000 grams, the polymerization was interrupted by stopping the mechanical stirring, cooling and venting the unreacted TFE. The aqueous latex of polymer particles in the $—SO_2F$ form thus obtained had a polymer concentration of 28 wt %. The aqueous latex was kept under nitrogen bubbling for 16 hours in order to eliminate the presence of residual unreacted monomers, and it was stored in a plastic tank.

b) Determination of the Equivalent Weight (EW) of the Perfluoro Sulfonyl Fluoride Polymer.

A sample of the aqueous latex of the perfluoro sulfonyl fluoride polymer in the $—SO_2F$ form obtained in step (a) was coagulated by freezing and thawing and the recovered polymer was washed with water and dried for 40 hours at 150° C. A film was formed from said dry polymer powder, by heating (270° C.) and pressing it for 5 minutes. A film sample having a size of 100 cm² (10×10 cm) was treated with a 10 wt % aqueous KOH solution (at 80° C. during 24 hours) and then, after washing with distilled water, with a 20 wt % aqueous $HNO_3$ solution (at ambient temperature during 1 hour). The film sample was finally washed with distilled water. The $—SO_2F$ groups of the perfluoro sulfonyl fluoride polymer were thus transformed into the corresponding sulfonic $—SO_3H$ groups. After drying in vacuum at 150° C., the film was titrated with diluted NaOH. The equivalent weight of the polymer resulted to be equal to 850 grams/equivalent, c) Preparation of the Liquid Dispersion (LD)1.

A quantity of 4 grams of Pt on carbon (Pt/C) catalyst containing 50 wt % of platinum (TANAKA) were dispersed in 300 milliliters of water, heated to 80° C. and stirred until the solid was completely wetted and a slurry was obtained. The slurry was then sonicated for 30 minutes maintaining the temperature at 80° C. While maintaining the slurry stirred, the aqueous latex of the perfluoro sulfonyl fluoride polymer in the $—SO_2F$ form produced in step (a) was added dropwise with a rate of 1 drop every 3 seconds until a ratio of 3:1 between the weight of the catalyst and the weight of the polymer added was reached. The slurry was stirred further for 60 minutes at 80° C. and then it was filtered at this temperature on paper filters. The filtered solid was then washed with 500 milliliters of hot deionized water (80° C.). The solid was finally recovered and dried in an oven at 80° C. during about 16 hours. After drying, the solid was grinded until obtaining 5.3 grams of a smooth powder consisting of particles of catalyst and polymer in the $—SO_2F$ form. A quantity of 4 grams of the obtained powder were dispersed in 40 grams of a pH 7 water solution containing 4000 ppm of Carbopol® viscosity modifier (the pH value of the solution was adjusted by adding a few drops of diluted aqueous KOH).

Example 2

Preparation of the Catalyst-Polymer Liquid Dispersion (LD)2

The catalyst-polymer liquid dispersion (LD)2 was prepared following the same procedure described in the case of Example 1, except that, in step (c), the weight ratio between the catalyst and the polymer was equal to 9:1.

Example 3

Preparation of the Catalyst-Polymer Liquid Dispersion (LD)3 a) Preparation of an Aqueous Latex of a Perfluoro Sulfonyl Fluoride Polymer in the $—SO_2F$ Form (EW 1100 Grams/Equivalent).

In a 22 liters autoclave the following reagents were charged:

11.5 liters of demineralized water 980 grams of the sulfonyl fluoride perfluoro vinyl ether with formula:

$CF_2=CF—O—CF_2—CF_2—SO_2F$ 1100 grams of a water solution containing 5 wt % of the fluorinated surfactant 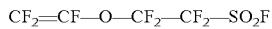 $CF_2ClO(CF_2CF(CF_3)O)_n(CF_2O)_mCF_2COOK$ (average molecular weight=521; n/m=10).

The content of the autoclave was stirred at 540 rpm and heated. Once reached a temperature of 60° C., 150 milliliters of a water solution containing 6 grams of potassium persulfate per liter were added. The pressure in the autoclave was maintained at a value of 15.5 bar abs. while feeding 1000 grams of tetrafluoroethylene (TFE). Once completed the addition of TFE, 175 grams of $CF_2=CF—O—CF_2—CF_2—SO_2F$ were further fed into the autoclave. During the polymerization reaction, additional amounts of TFE and $CF_2=CF—O—CF_2—CF_2—SO_2F$ were fed into the autoclave (175 grams of $CF_2=CF—O—CF_2—CF_2—SO_2F$ for every 200 grams of TFE). After an overall polymerization reaction time of 150 minutes and the addition of a total amount of TFE of 4000 grams, the polymerization was interrupted by stopping the mechanical stirring, cooling and venting the unreacted TFE. The aqueous latex of polymer particles in the $—SO_2F$ form thus obtained had a polymer concentration of 27 wt %. The aqueous latex was kept under nitrogen bubbling for 16 hours in order to eliminate the presence of residual unreacted monomers, and it was stored in a plastic tank.

(b) Determination of the Equivalent Weight (EW) of the Perfluoro Sulfonyl Fluoride Polymer.

The equivalent weight (EW) was determined according to the same procedure described in the case of Example 1. The equivalent weight (EW) of the polymer resulted to be equal to 1100 grams/equivalent, (c) Preparation of the Liquid Dispersion (LD)3.

The catalyst-polymer liquid dispersion $(LD)_3$ was prepared according to the same procedure of step (c) of Example 1.

Example 4

Preparation of the Catalyst Coated Membrane Precursor (CCMP)1

As membrane consisting of at least one (per)fluoro sulfonyl fluoride polymer in the $—SO_2F$ form was used a 42 microns Hyflon® Ion membrane precursor with formula $(C_2F_4)_n(C_4F_8O_3S)_m$ (n/m=6.1; EW=850 grams/equivalent). The catalyst-polymer liquid dispersion (LD)1 prepared in Example 1 was applied on both sides of a 121 cm² square sample (11 cm×11 cm) of said membrane precursor by painting. The painted zone on each face of the membrane was about 25 cm$^2$ in area (5 cm×5 cm) and the unpainted membrane extended beyond the painted zone by about 3 cm on each of the four sides of the square sample. The painted membrane was heated in an oven at 60° C. for 30 minutes in order to complete the removal of the liquid. In this manner, two identical electrode layers comprising the catalyst and the binder polymer in the —SO$_2$F form adhering on the membrane precursor were formed. The catalyst coated membrane precursor (CCMP)1 thus obtained was then inserted between two foils (1 mm thick each) of polytetrafluoroethylene (PTFE) and pressed with a load of 15 kg/cm$^2$ at 150° C. for 10 minutes. After cooling, the two PTFE foils were peeled off the catalyst coated membrane precursor (CCMP)1. An excellent adhesion was observed between the membrane precursor and the electrode layers.

Example 5

Preparation of the Catalyst Coated Membrane Precursor (CCMP)2

The catalyst coated membrane precursor (CCMP)2 was prepared according to the same procedure described in the case of Example 4, except that, as catalyst-polymer liquid dispersion, was used the catalyst-polymer liquid dispersion (LD)2 prepared in Example 2.

Example 6

Preparation of the Catalyst Coated Membrane Precursor (CCMP)3

The catalyst coated membrane precursor (CCMP)3 was prepared according to the same procedure described in the case of Example 4, except that, as catalyst-polymer liquid dispersion, was used the catalyst-polymer liquid dispersion (LD)3 prepared in Example 3.

Example 7

Preparation of the Catalyst Coated Membrane (CCM)1 in the —SO$_3$H Form

The catalyst coated membrane (CCM)1 was prepared by submitting the catalyst coated membrane precursor (CCMP)1 to the following treatment: (a) salification in a 10 wt % aqueous KOH solution (during 8 hours at 80° C.); (b) washing with distilled water; (c) acidification in 20 wt % aqueous HNO$_3$ solution (during 1 hour at ambient temperature); (c) washing with distilled water. In this manner, the sulfonyl —SO$_2$F groups present in the (CCMP)1 (i.e. in the membrane precursor and the electrode layers) were transformed into the corresponding sulfonic —SO$_3$H groups. The thickness of (CCM)1 was 74±5 microns.

Example 8

Preparation of the Catalyst Coated Membrane (CCM)2 in the —SO$_3$H Form

The catalyst coated membrane (CCM)2 was prepared by submitting the catalyst coated membrane precursor (CCMP)2 to the same treatment described in the case of Example 7.

Example 9

Preparation of the Catalyst Coated Membrane (CCM)3 in the —SO$_3$H Form

The catalyst coated membrane (CCM)3 was prepared by submitting the catalyst coated membrane precursor (CCMP)3 to the same treatment described in the case of Example 7.

Example 10 (Comparison)

Preparation of the Catalyst Coated Membrane (CCM)4 in the —SO$_3$H Form

A catalytic ink was prepared by adding 4 grams of a Pt/C catalyst containing 50 wt % of platinum (TANAKA) to 40 grams of a 3 wt % dispersion of Hyflon® Ion with formula $(C_2F_4)_n(C_4F_7O_4SH)_m$ (n/m=6.1; EW=850 grams/equivalent) in a hydro-alcoholic dispersing medium (20 wt % water, 40 wt % 1-propyl alcohol, 40 wt % 2-propyl alcohol). The slurry was stirred at ambient temperature and then sonicated at 25° C. for 30 minutes. The slurry was knife-casted (Braive®) on two PTFE support foils thus obtaining two PTFE supported films each one having a thickness of 150 microns and being about 25 cm$^2$ in area (5 cm×5 cm). The two PTFE supported films were then dried in an oven at 65° C. for 20 minutes thus obtaining two PTFE supported electrode layers. A 121 cm$^2$ square sample (11 cm×11 cm) of a 50 microns Hyflon Ion® acid-form membrane with formula $(C_2F_4)_n(C_4F_7O_4SH)_m$ (n/m=6.1; EW=850 grams/equivalent) was placed between the two PTFE supported electrode layers with the electrode layers facing the membrane. The resulting multilayer structure was hot pressed with a compression force of 30 kg/cm$^2$ at a temperature of 205° C. for 5 minutes. After cooling, the PTFE foils were peeled off and the electrode layers were transferred onto the surfaces of the membrane. Each electrode layer was 25 cm$^2$ in area (5 cm×5 cm) and the uncoated membrane extended beyond the electrode zone by about 3 cm on each side of the square sample. The thickness of the catalyst coated membrane (CCM)4 in the —SO$_3$H form after hot-pressing (i.e. the thickness of the membrane plus that of the electrode layers) was of 74±5 microns.

Example 11 (Comparison)

Preparation of the Catalyst Coated Membrane (CCM)5 in the —SO$_3$H Form

A catalytic ink was prepared by adding 4 grams of a Pt/C catalyst containing 50 wt % of platinum (TANAKA) to 40 grams of a 3 wt % dispersion of Hyflon® Ion with formula $(C_2F_4)_n(C_4F_7O_4SH)_m$ (n/m=6.1; EW=850 grams/equivalent) in a hydro-alcoholic dispersing medium (20 wt % water, 40 wt % 1-propyl alcohol, 40 wt % 2-propyl alcohol). The slurry was stirred at ambient temperature and then sonicated at 25° C. for 30 minutes.

A water solution containing 30 wt % of KOH was then added dropwise to the slurry under stirring in order to transform the sulfonic —SO$_3$H groups of the ionomer into the corresponding sulfate —SO$_3$K groups.

The slurry was knife-casted (Braive®) on two PTFE support foils thus obtaining two PTFE supported films each one having a thickness of 150 microns and being about 25 cm$^2$ in area (5 cm×5 cm). The two PTFE supported films were then dried in an oven at 65° C. for 20 minutes thus obtaining two PTFE supported electrode layers.

A 121 cm² square sample (11 cm×11 cm) of a 50 microns Hyflon Ion® Acid-form membrane with formula $(C_2F_4)_n(C_4F_7O_4SH)_m$ (n/m=6.1; EW=850 grams/equivalent) was treated with a water solution containing 10 wt % of KOH during 1 hour at ambient temperature in order to transform the sulfonic —$SO_3H$ groups of the acid-form membrane into the corresponding sulfate —$SO_3K$ groups. The square sample was placed between the two PTFE supported electrode layers previously described with the electrode layers facing the membrane. The resulting multilayer structure was hot pressed with a compression force of 30 kg/cm² at a temperature of 205° C. for 5 minutes. After cooling, the PTFE foils were peeled off and the electrode layers were transferred onto the surfaces of the membrane. The resulting multilayer structure was acidified in 20 wt % aqueous $HNO_3$ solution (during 1 hour at ambient temperature) and washed with distilled water. Each electrode layer was 25 cm² in area (5 cm×5 cm) and the uncoated membrane extended beyond the electrode zone by about 3 cm on each side of the square sample. The thickness of the catalyst coated membrane (CCM)5 in the —$SO_3H$ form (i.e. the thickness of the membrane plus that of the electrode layers) was of 74±5 microns.

Example 12

Evaluation of the Electrochemical Resistivity of (CCM)1-3 and (CCM)4-5 in a Fuel Cell The electrochemical resistivity of each one of the catalyst coated membranes (CCM)1-3, according to the invention, and (CCM)4-5, comparison, was evaluated as described here below. A fuel cell was assembled with one of the previously described (CCM)s by using a Fuel Cell Technology® 25 cm² single cell package with triple serpentine pattern on the cathode side, single serpentine on the anode side and E-Tek® LT2500W diffuser as gas diffusion layers. The fuel cell was run under the following operating conditions: cell temperature, 75° C.; temperature of reactant gas humidifiers, 75° C.; air flow, 1300 Standard Cubic Centimeters per Minute (SCCM); hydrogen flow, 650 SCCM; current density, 1.2 A/cm²; pressure, 2.5 bar abs. on both anode and cathode side. After 8 hours, the electronic load was disconnected and, without modifying the fuel cell operating conditions, the anode and cathode current collectors were connected to a CPU controlled modular high current galvanostat/potentiostat (Potentiostat Autolab® PGSTAT30 from ECO CHEMIE) equipped with an impedance analyzer module (FRA2) and with a current elevator ("booster") enabling to run up to 20 A. The fuel cell voltage was set to 0.7 Volts and the cell was run during 10 minutes to achieve complete stabilization. The value of the real component (Z) of the impedance when the imaginary component (iZ) was equal to zero (representing the ohmic component of the fuel cell impedance) was measured. The observed values of the real component of the impedance at iZ=0 and the corresponding frequencies are reported in Table 1.

TABLE 1

| CCM | Real component (Z) of impedance when imaginary component (iZ) = 0 (Ohm × cm²) | Frequency (Hz) |
|---|---|---|
| (CCM)1 | 0.047 | 5700 |
| (CCM)2 | 0.054 | 4100 |
| (CCM)3 | 0.055 | 1800 |
| (CCM)4 (comparison) | 0.058 | 1630 |
| (CCM)5 (comparison) | 0.055 | 1630 |

It has to be noted that the ohmic component of (CCM)1 is significantly lower than the ohmic component of comparisons (CCM)4 and (CCM)5 manufactured according to prior art procedures. Furthermore, the ohmic component of (CCM)2 is still noticeably lower than the ohmic component of comparisons (CCM)4 and (CCM)5, although the amount of ionomer binder incorporated in the electrode layers of (CCM)2 was considerably lower than the amount of ionomer binder of similar EW incorporated in the electrode layers of the comparisons. Finally, the ohmic component of (CCM)3 was lower or, at least, equal to the ohmic values of comparisons (CCM)4 and (CCM)5, although the EW of its ionomeric binder was considerably higher (1100 grams/equivalent) than the EW of the ionomeric binder used for the comparisons (850 grams/equivalents).

Example 13

Preparation of the Catalytic Ionomeric Ink (CII)1

A quantity of 4 grams of Pt on carbon (Pt/C) catalyst containing 50 wt % of platinum (TANAKA) were dispersed in 300 milliliters of water, heated to 80° C. and stirred until the solid was completely wetted and a slurry was obtained. The slurry was then sonicated for 30 minutes maintaining the temperature at 80° C. While maintaining the slurry stirred, the aqueous latex of the perfluoro sulfonyl fluoride polymer in the —$SO_2F$ form produced in step (a) of Example 1 was added dropwise with a rate of 1 drop every 3 seconds until a ratio of 3:1 between the weight of the catalyst and the weight of the polymer added was reached. The slurry was stirred further for 60 minutes at 80° C. and then it was filtered at this temperature on paper filters. The filtered solid was washed with 500 milliliters of hot deionized water (80° C.). The solid was finally recovered and dried in an oven at 80° C. during about 16 hours. After drying, the solid was grinded until obtaining 5.3 grams of a smooth powder consisting of particles of catalyst and polymer in the —$SO_2F$ form. The powder was then treated during 8 hours at 80° C. in 500 milliliters of a 10 wt % aqueous KOH solution, then filtered and washed with distilled water. Said powder was then treated with 500 milliliters of a 20 wt % aqueous $HNO_3$ (during 1 hour at ambient temperature). The powder was filtered, washed, dried and milled. The weight of the powder indicated that substantially all the ionomer was retained within the catalyst particles. The entire amount of the powder was dispersed into 38.8 grams of a hydro-alcoholic liquid phase (consisting of 20 wt % of water, 40 wt % of 1-propyl alcohol and 40 wt % of 2-propyl alcohol), obtaining the catalytic ionomeric ink (CII)1 in the form of a slurry. The slurry was further stirred at ambient temperature and then sonicated during 30 minutes at 25° C.

Example 14

Preparation of the Catalyst Coated Membrane (CCM-CII)1 from Catalytic Ionomeric Ink (CII)1

The catalyst coated membrane (CCM-CII)1 was prepared starting from the catalytic ionomeric ink (CII)1 and a 50 microns Hyflon Ion® acid-form membrane with formula $(C_2F_4)_n(C_4F_7O_4SH)_m$ (n/m=6.1;

EW=850 grams/equivalent) following the same procedure described for Example 10. The thickness of the catalyst coated membrane (CCM-CII)1 after hot-pressing (i.e. the thickness of the membrane plus that of the electrode layers) was of 74±5 microns.

Example 15

Evaluation of the Performance of the Catalyst Coated Membrane (CCM-CII)1 and of Comparison (CCM)4

A fuel cell was set up using the catalyst coated membranes (CCM-CII)1 according to the same procedure described in Example 12. The fuel cell was run during 8 hours under the same operating conditions of Example 12, then cell temperature was raised up to 90° C. and the voltage value at different current densities was recorded, see Table 2. A similar test was performed with the previously described comparison catalyst coated membranes (CCM)4.

TABLE 2

| Current Density (A/cm$^2$) | Voltage of (CCM-CII)1 (mV) | Voltage of (CCM)4 (comparison) (mV) |
| --- | --- | --- |
| 1.2 | 567 | 533 |
| 1 | 650 | 583 |
| 0.8 | 712 | 632 |
| 0.6 | 749 | 682 |
| 0.4 | 783 | 722 |
| 0.2 | 827 | 788 |
| 0 | 943 | 937 |

It is evident from the electrochemical data reported in Table 2 that the invention (CCM-CII)1 exhibits better voltage/current balance than comparison (CCM)4 when used in a fuel cell.

The invention claimed is:

1. A method (M-CCMP) to obtain a catalyst coated membrane precursor (CCMP), said method comprising:
   step (j), applying onto at least one surface of a membrane a catalyst-polymer liquid dispersion (LD), the liquid dispersion (LD) comprising (i) catalyst particles, (ii) polymer particles consisting of at least one (per)fluoro sulfonyl fluoride polymer in the —SO$_2$F form, and (iii) an aqueous suspending medium,
   wherein said membrane is a film consisting of at least one (per)fluoro sulfonyl fluoride polymer in the —SO$_2$F form;
   step (jj), removing the liquid of the liquid dispersion so as to form a multilayer structure comprising at least one coating solid layer adhering onto the at least one surface of the membrane, said at least one coating solid layer comprising catalyst particles and polymer particles, said polymer particles consisting of at least one (per)fluoro sulfonyl fluoride polymer in the —SO$_2$F form; and
   optionally, step (jjj), hot pressing the multilayer structure.

2. The method (M-CCMP) according to claim 1, wherein the (per)fluoro sulfonyl fluoride polymer in the —SO$_2$F form comprises repeating monomeric units derived from: (A') at least one C$_2$-C$_8$ perfluoro olefin; (B') at least one sulfonyl fluoride perfluoro vinyl ether.

3. The method (M-CCMP) according to claim 2, wherein said sulfonyl fluoride perfluoro vinyl ether (B') has a formula F$_2$C=CF—O—CF$_2$—CF$_2$—SO$_2$F.

4. The catalyst coated membrane precursor (CCMP) obtainable by the method (M-CCMP) according to claim 1.

5. A method (M-CCM) to obtain a catalyst coated membrane (CCM), said method comprising:
   step (j') applying onto at least one surface of a membrane a catalyst-polymer liquid dispersion (LD), the liquid dispersion (LD) comprising (i) catalyst particles, (ii) polymer particles consisting of at least one (per)fluoro sulfonyl fluoride polymer in the —SO$_2$F form, and (iii) an aqueous suspending medium,
   wherein the membrane is a film consisting of at least one (per)fluoro sulfonyl fluoride polymer in the —SO$_2$F, —SO$_3$H and/or —SO$_3$M form, wherein M is a metal;
   step (jj'), removing the liquid so as to form a multilayer structure comprising at least one coating solid layer adhering upon the at least one surface of the membrane, said at least one coating solid layer comprising catalyst particles and polymer particles, said polymer particles consisting of at least one (per)fluoro sulfonyl fluoride polymer in the —SO$_2$F form;
   optionally, step (jjj'), hot pressing the multilayer structure; and
   step (jv'), transforming the sulfonyl —SO$_2$F groups present in the multilayer structure into sulfonate —SO$_3$M or sulfonic —SO$_3$H groups, wherein M is a metal.

6. The method (M-CCM) according to claim 5, wherein the membrane provided in step (j') is a film consisting of at least one (per)fluoro sulfonyl fluoride polymer in the —SO$_2$F form.

7. The method (M-CCM) according to claim 5, wherein the membrane provided in step (j') is a film consisting of at least one (per)fluoro sulfonyl fluoride polymer in the —SO$_3$H or the —SO$_3$M form.

8. A catalyst coated membrane (CCM) obtainable by the method (M-CCM) according to claim 5, wherein the CCM exhibits a real component (Z) of impedance when the imaginary component (iZ) is equal to zero not greater than 0.055 Ohm×cm$^2$ and a corresponding frequency of no less than 1800 Hz.

9. The method (M-CCMP) according to claim 1, wherein said (per)fluoro sulfonyl fluoride polymer of the liquid dispersion (LD) comprises repeating monomeric units derived from: (A), at least one ethylenically unsaturated (per)fluoro monomer free from —SO$_2$F groups; (B), at least one (per)fluoro vinyl ether comprising at least one —SO$_2$F group.

10. The method (M-CCMP) according to claim 9, wherein said at least one (per)fluoro vinyl ether (B) of the liquid dispersion (LD) comprises at least one —SO$_2$F group is a sulfonyl fluoride perfluoro vinyl ether with formula F$_2$C=CF—O—CF$_2$—CF$_2$—SO$_2$F.

11. The method (M-CCMP) according to claim 10, wherein said polymer particles of the liquid dispersion (LD) are those of an aqueous latex.

12. The method (M-CCMP) according to claim 11, wherein the polymer particles of the aqueous latex have a size of at least about 10 nm.

13. The method (M-CCMP) according to claim 11, wherein the polymer particles of the aqueous latex have a size of at most about 300 nm.

14. The method (M-CCMP) according to claim 11, wherein the aqueous latex is obtainable throughout an emulsion or micro-emulsion polymerization process comprising the copolymerization of the monomers (A) and (B).

15. The method (M-CCMP) according to claim 11, wherein said aqueous suspending medium comprises the liquid suspending medium of the latex.

16. The method (M-CCMP) according to claim 11, wherein the liquid dispersion is substantially free from the liquid suspending medium of said latex.

17. The method (M-CCMP) according to claim 1, wherein the liquid dispersion (LD) further comprises at least one viscosity modifier.

18. The method (M-CCMP) according to claim 1, wherein the liquid dispersion (LD) is substantially free from any organic solvent.

19. The method (M-CCMP) according to claim 1, wherein the weight amount of said (i) catalyst particles, said (ii) polymer particles and said (iii) aqueous suspending medium is of at least 96 wt % based on the total weight of the liquid dispersion (LD).

20. The method (M-CCMP) according to claim 1, wherein the liquid dispersion (LD) consists essentially of (i) catalyst particles, (ii) polymer particles consisting of at least one (per)fluoro sulfonyl fluoride polymer in the —$SO_2F$ form, (iii) an aqueous suspending medium, and (iv), optionally, at least one viscosity modifier.

* * * * *